(12) United States Patent
Fifield

(10) Patent No.: US 6,504,834 B1
(45) Date of Patent: Jan. 7, 2003

(54) WIRELESS NETWORK

(75) Inventor: Robert Fifield, Redhill (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/102,838

(22) Filed: Jun. 23, 1998

(30) Foreign Application Priority Data

Aug. 7, 1997 (GB) .............................. 9716626

(51) Int. Cl.[7] .............................. H04Q 7/00; H04J 3/00; H04B 7/212
(52) U.S. Cl. ........................ 370/345; 370/329; 370/327; 370/437; 435/426; 435/447
(58) Field of Search ................................ 370/314, 337, 370/345, 346, 347, 350, 508, 445, 449, 468, 458, 474, 321, 329, 280; 455/426, 447, 66; 713/150, 160, 213; 320/337

(56) References Cited

U.S. PATENT DOCUMENTS

| | | | | |
|---|---|---|---|---|
| 5,239,673 A | * | 8/1993 | Natarajan | 455/426 |
| 5,274,841 A | * | 12/1993 | Natarajan et al. | 455/334 |
| 5,276,703 A | * | 1/1994 | Budin et al. | 375/130 |
| 5,384,777 A | * | 1/1995 | Ahmadi et al. | 370/337 |
| 5,559,804 A | * | 9/1996 | Amada et al. | 370/347 |
| 5,594,738 A | * | 1/1997 | Crisler et al. | 370/347 |
| 5,638,371 A | * | 6/1997 | Raychaudhuiri et al. | 370/347 |
| 5,640,395 A | * | 6/1997 | Hamalainen et al. | 370/322 |
| 5,644,576 A | * | 7/1997 | Bauchot et al. | 370/437 |
| 5,729,534 A | * | 3/1998 | Jokinen et al. | 370/280 |
| 5,752,193 A | * | 5/1998 | Scholefield et al. | 455/452 |
| 5,818,830 A | * | 10/1998 | Daane et al. | 370/347 |
| 5,905,720 A | * | 5/1999 | Lin | 370/337 |
| 5,970,062 A | * | 10/1999 | Bauchot | 370/345 |
| 6,055,242 A | * | 4/2000 | Doshi et al. | 370/458 |
| 6,097,707 A | * | 8/2000 | Hodzic et al. | 370/321 |
| 6,178,512 B1 | * | 1/2001 | Filfield | 713/201 |
| 6,243,372 B1 | * | 6/2001 | Petch et al. | 370/350 |
| 6,295,285 B1 | * | 9/2001 | Whitehead | 370/329 |

FOREIGN PATENT DOCUMENTS

GB 2069799 B 8/1981 .............. H04J/3/16

* cited by examiner

Primary Examiner—Wellington Chin
Assistant Examiner—M. Phan
(74) Attorney, Agent, or Firm—Daniel J. Piotrowski

(57) ABSTRACT

A method of operating a wireless network comprising a plurality of wireless terminals and optionally a base station uses a transmission frame (300) including an association section (310) for use by wireless terminals wishing to join the network. A variable number of association sections (310) is scheduled in response to operating characteristics such as the load on the network or the presence of a high security application on the network.

10 Claims, 2 Drawing Sheets

WIRELESS NETWORK

BACKGROUND OF THE INVENTION

The present invention relates to wireless networks for communication between a number of wireless terminals which are free to join and leave the network at any time. The network may be configured so that all the wireless terminals communicate through a base station, or so that the devices communicate directly with one another.

Wireless networks are intended to offer flexible and cost-effective alternatives to wired networks, for example as Local Area Networks (LANs). An advantage of wireless over fixed networks is the ease with which new networks can be created and with which new devices, known as wireless terminals, can be added to the network. Some wireless network standards exist, for example IEEE 802.11 in the USA and HIPERLAN in Europe, whilst others are under development, for example Wireless Asynchronous Transfer Mode (WATM). Such standards define the format of a transmission frame, within which control and data transfer functions can take place. The format and length of transmission frames may be fixed or dynamically variable.

Known wireless networks, for instance as disclosed in U.S. Pat. No. 5,274,841, typically operate in one of two different configurations:

1 A base station orientated configuration in which wireless terminals can only communicate with each other with the support of a base station, which is responsible for all wireless terminals within a certain radio coverage area. The base station itself may be connected to further wired networks for communications beyond the radio coverage area. The base station may be a separate unit, or it may be a wireless terminal with additional functionality.

2 A peer to peer configuration in which wireless terminals communicate directly with one another. One of the wireless terminals is typically chosen dynamically to perform the control function.

The first configuration is generally considered to be most suitable for networks with a relatively fixed structure, while the second is considered most suitable for the generation of dynamic networks, such as for document exchange at a meeting.

In order for a wireless network to realise the advantage of flexibility, the procedure for wireless terminals joining and leaving the network should be as simple as possible. The act of a wireless terminal joining a network is known as association and needs to be scheduled within the data transmission format defined for the wireless network. Examples of known techniques for association include dynamic framelength slotted ALOHA, described in GB-B-2 069 799, carrier sense multiple access and address based tree resolution algorithms.

OBJECTS AND SUMMARY OF THE INVENTION

An object of the present invention is to improve the flexibility and efficiency of association to a wireless network.

According to a first aspect of the present invention there is provided a method of operating a wireless network, wherein transmission of data takes place in transmission frames of variable length subdivided into a plurality of time slots, the wireless network comprising a controller and a variable number of wireless terminals, the method comprising the controller maintaining a list of wireless terminals currently registered with the network, determining the lengths of successive transmission frames, and allocating time slots within said frame for various purposes, characterised by the controller scheduling a variable number n of association sections in each transmission frame, where n has a minimum value of zero, in response to the current operating characteristics of the network, by which association sections the wireless terminals can register with the controller.

If desired, the association sections may use a contention based protocol.

According to a second aspect of the present invention there is provided a controller for a wireless network having a plurality of wireless terminals, the controller comprising means for maintaining a list of wireless terminals currently registered with the network, means for monitoring the operating characteristics of the network, means for determining the lengths of successive transmission frames and means for allocating time slots within each of said frames, characterised by means responsive to the current operating characteristics of the network for scheduling a variable number n of association sections in each transmission frame, where n has a minimum value of zero.

According to a third aspect of the present invention there is provided a wireless terminal for use in a wireless network constituted by at least one wireless terminal and a controller, the wireless terminal comprising transceiver means for obtaining scheduling information relating to transmission frames in the network, characterised by means for determining whether an association section is available in a transmission frame and in that in response to said means the wireless terminal attempts association during the association section.

The present invention is based upon the recognition, not present in the prior art, that adding an explicit association section to a transmission frame format and enabling this association section to be scheduled more or less frequently depending on system load improves the efficiency and flexibility of operation of a wireless network.

By means of the present invention a wireless network can schedule a variable number of association sections dependent on considerations such as network loading and the number of active wireless terminals.

BRIEF DESCRIPTION OF THE DRAWINGS

The present invention will now be described, by way of example, with reference to the accompanying drawings, wherein.

In the drawings the same reference numerals have been used to indicate corresponding features.

DESCRIPTION OF THE PREFERRED EMBODIMENTS

Figure 1:
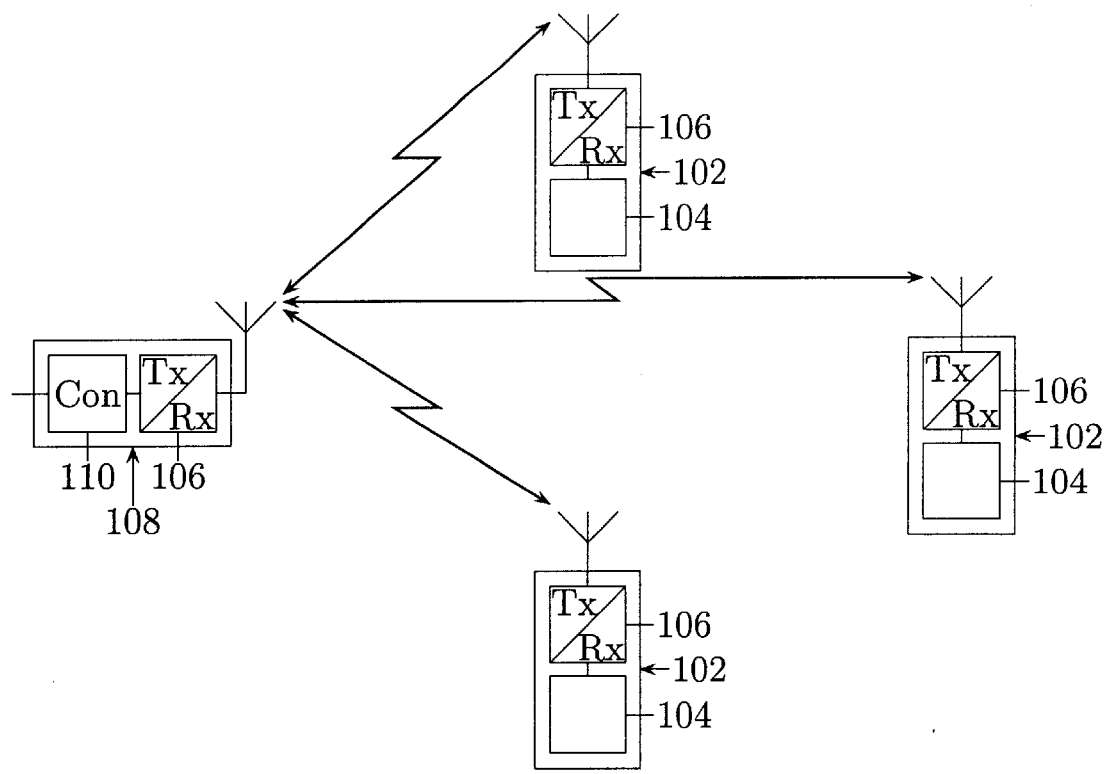
FIG. 1 is a block schematic diagram of a wireless network made in accordance with the present invention, having a base station orientated configuration.

The base station orientated wireless network shown in FIG. 1 comprises a number of wireless terminals 102 and a base station 108, which base station is optionally connected to a fixed telecommunications network, for example the PSTN. The wireless terminals 102 comprise transceivers 106 which communicate with one another via the base station 108 which comprises a transceiver 106 and a controller 110. The controller 110 may be at the same location as the transceiver 106 or remote from it and connected by land line connection means. A variety of devices may be configured to act as wireless terminals 102, for example portable computers, printers and measurement equipment. In addition to the transceiver 106 each wireless terminal also comprises an application-specific block 104 which implements the required functionality.

Figure 2:
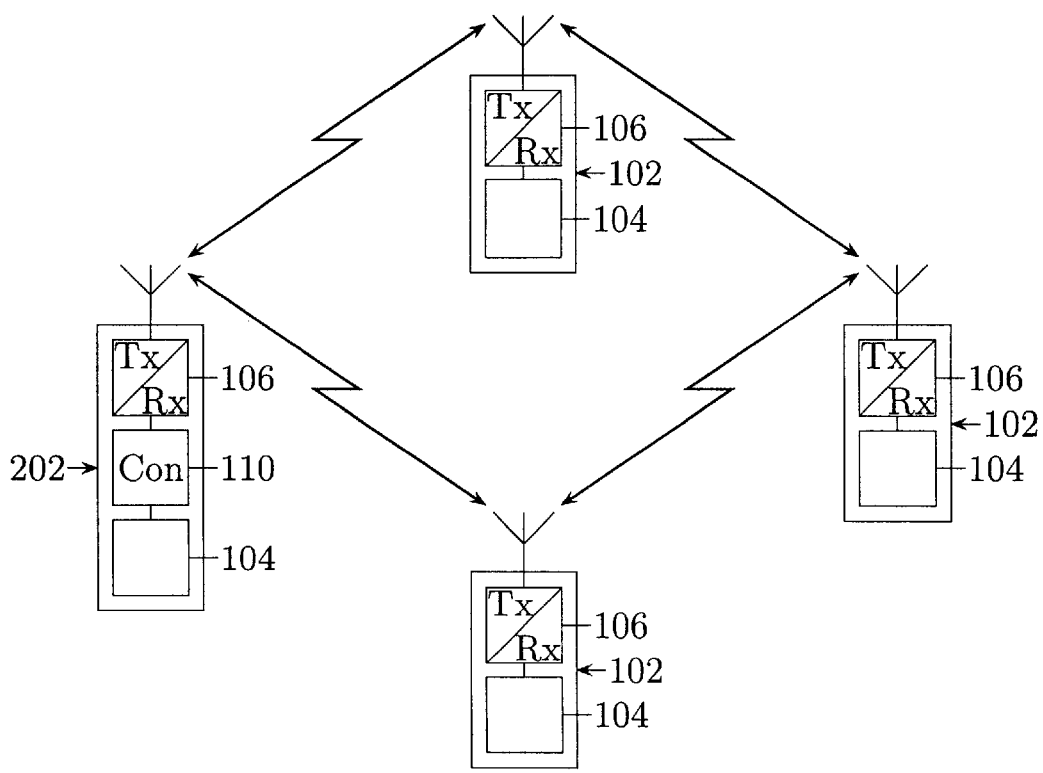
FIG. 2 is a block schematic diagram of a wireless network made in accordance with the present invention, having a peer to peer configuration.

The peer to peer wireless network shown in FIG. 2 comprises a number of wireless terminals 102 and an enhanced wireless terminal 202, which comprises a transceiver 106 and application-specific block 104, as for a standard wireless terminal, and further comprises a controller 110 to enable it to perform the control function in a wireless network if required. The wireless terminals 102 and enhanced wireless terminals 202 communicate directly with one another rather than via a base station. If there is only one enhanced wireless terminal 202 it performs the control function for the network, otherwise, one of the enhanced wireless terminals 202 is chosen dynamically to perform the control function.

Figure 3:
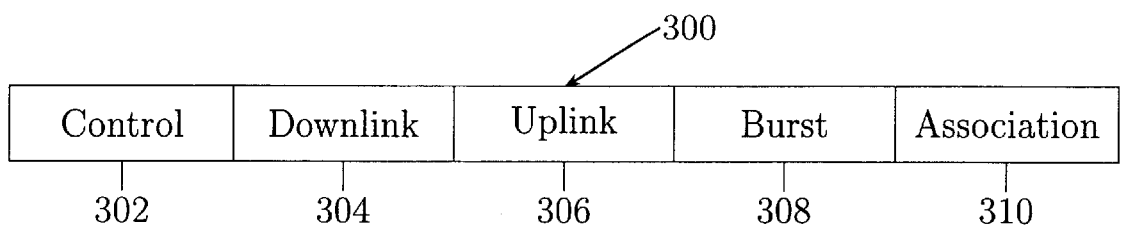
FIG. 3 is a diagram of an example of a possible transmission frame format suitable for use in a wireless network configured with a base station of the type shown in FIG. 1.

The format of the transmission frame 300 shown in FIG. 3 is for a base station orientated configuration of the type shown in FIG. 1. This particular format is intended for use with WATM and similar standards aimed at wireless local area networks. The format is a time division format comprising successive transmission frames 300, where each transmission frame 300 is divided into a number of sections, each of which contains a number of slots in which data is transmitted. The lengths of the complete frames and the sections within them can be varied in response to changing requirements for data transmission to and from the wireless terminals 102.

A control section 302 is used by the base station 108 to signal the allocation of slots to wireless terminals 102 in the sections comprising the remainder of the frame 300. The allocation takes into consideration the number of slots requested by the wireless terminals 102, the available bandwidth, restrictions on the length of transmission frames and any other relevant criteria.

A downlink section 304 is used for transfer of data from the base station 108 to wireless terminals 102, the transfer of data to a particular wireless terminal 102 taking place in the slots allocated for it during the control section 302. An uplink section 306 is used for transfer of data in the reverse direction, from wireless terminals 102 to the base station 108. Again, the transfer of data from a particular wireless terminal 102 takes place in the slots allocated for it during the control section 302.

An energy burst section 308 is provided for use by wireless terminals 102 that have associated with the network but are inactive. Each of these terminals is assigned a unique slot within the energy burst section 308 in which it may transmit to indicate that it requires an uplink slot to transmit data. The base station 108 will then take this request into account when scheduling the slots in the uplink section 306 of the next transmission frame 300.

An association section 310 is provided for use by wireless terminals 102 that wish to join the network. The detailed working of this section is described below. The association section may not always be present, as it is scheduled under control of the base station 108. The base station 108 may modify the scheduling of the association section 310 to:

Schedule an association section 310 when it is convenient. This minimises the risk of losing transmission packets due to peaks in transmission traffic. Under conditions of high network traffic the base station 108 may not schedule an association section 310 in a transmission frame. In order to avoid completely shutting out new wireless terminals 102 the base station 108 may be controlled so that there is a maximum time delay between one association section and the next.

Schedule association sections 310 more frequently during conditions of low network traffic. This allows faster association for waiting wireless terminals 102.

Schedule multiple association sections 310. This may be desirable when many wireless terminals 102 wish to associate, for example if no association sections 310 have been scheduled for some time.

Schedule no association sections 310, which may be desirable in some special circumstances. One example when the network has no spare capacity, another example is when a high security application is running and wishes to prevent any further wireless terminals 102 joining the network.

It should be noted that the order of sections within the transmission frame illustrated in FIG. 3 may be varied, in particular it may be beneficial to schedule the energy burst section 308 and the association section 310 near the start of the frame to reduce transmission time delays.

Figure 4:
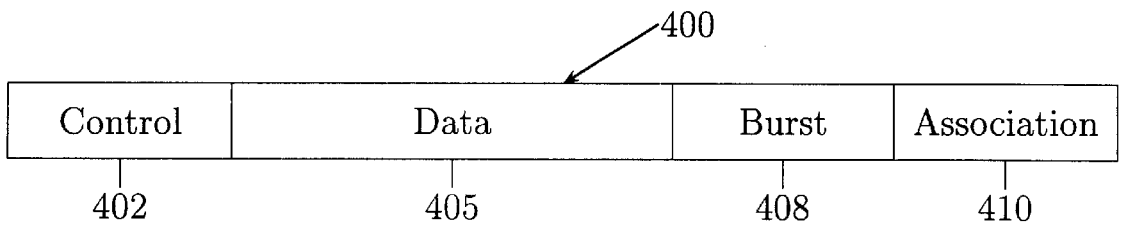
FIG. 4 is a diagram of an example of a possible transmission frame format suitable for use in a peer to peer configured wireless network of the type shown in FIG. 2.

The format of the transmission frame 400 shown in FIG. 4 is for a peer to peer configuration of the type shown in FIG. 2, although much of the format is the same as for the base station orientated frame format shown in FIG. 3. A control section 402 is used by the enhanced wireless terminal 202 acting as base station to allocate slots to wireless terminals 102 in the remainder of the frame. There are no separate downlink and uplink sections instead there is a data transfer section 405, where transfer of data from one wireless terminal 102 to another occurs in the slots allocated to it, the reservation of which was detailed during the control section 402.

The energy burst section 408 and association section 410 work in a similar manner to a base station orientated configuration.

Figure 5:
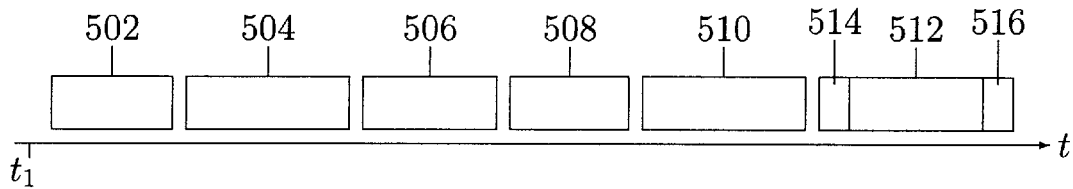
FIG. 5 shows in outline the process of a wireless terminal associating with the network.

Consider now in more detail the sequence of events occurring when a wireless terminal wishes to associate with a network, taking a base station orientated configuration as the example. FIG. 5 shows a sequence of transmission frames 502, 504, 506, 508, 510 and 512 transmitted over time t. Each frame has a format identical to or based on that shown in FIG. 3, although the total length of the transmission frame 300 and the sections within it may vary. At time $t_1$ a wireless terminal 102, identified subsequently as WTA, is switched on and wishes to associate with the network. The control section 302 of frame 502 indicates that no association section 310 is scheduled in this frame. The control section 302 also indicates the length of the frame 502, to enable WTA to turn off its radio transceiver for the duration of the frame to save battery power.

WTA then turns on its transceiver to receive the control section 302 of the next frame 504 which indicates that there is no association section 310 scheduled in this frame. WTA optionally turns off its receiver for the remainder of this frame to conserve power. The same procedure is followed for the subsequent frames 506, 508 and 510 which also have no association section 310 scheduled. Finally, scheduling information transmitted within the control section 514 of the next frame 512 indicates that an association section 516 is scheduled for the frame 512.

Figure 6:
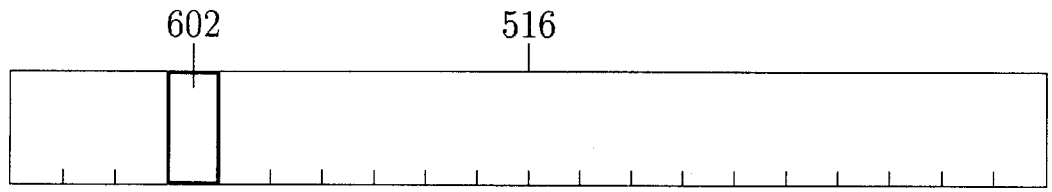
FIG. 6 is a diagram showing an expanded view of the association section in a transmission frame.

An expanded view of the association section 516 of frame 512 is shown in FIG. 6. In this example the association section 516 is subdivided into 20 slots, indicated by the tick marks in the figure. WTA has determined when the association section 516 will occur within the frame 512 from scheduling information transmitted in the control section 514 of frame 512. WTA then proceeds to poll in this section, for example using a contention based protocol such as the slotted ALOHA format disclosed in GB-B-2 069 799, which requires WTA to choose at random a slot within the association section 516. FIG. 6 shows WTA polling in the fourth slot 602. The base station 108 listens to any polls occurring during the association section 516, and notes the association request in the fourth slot 602.

The base station 108 now schedules a transmission slot in the uplink section 306 of a subsequent transmission frame. At this point the base station 108 can only determine that a wireless terminal attempted association in slot 602 of the association section 516 in frame 512. Hence in the control section 302 of the subsequent frame slots in the uplink section 306 are reserved for the wireless terminal 102 that attempted association in the fourth slot 602 of the association section 516. The information transmitted by WTA during this uplink slot enables the base station 108 to decide whether to allow WTA to associate with the network. If WTA is allowed to associate with the network, the association proceeds in the manner defined for the particular network standard being used.

It is possible for two or more wireless terminals 102 to poll in the same slot during an association section 310. This might not be detected by the base station 108 which would typically just be detecting whether any energy was transmitted in a particular slot. Hence the same wireless terminals 102 would then transmit during the transmission slot in the uplink section 306 reserved for the associating wireless terminal. If the base station 108 receives a corrupted signal during the scheduled transmission slot it therefore assumes that two or more wireless terminals 102 have transmitted at the same time, and takes appropriate actions. These actions may include not acknowledging the association requests, and scheduling another association section 310 as soon as convenient since it is known that there are wireless terminals 102 attempting association. The wireless terminals themselves know by not receiving an acknowledgement that their requests have not been successful, and will attempt association again.

A method of association in accordance with the present invention has the advantage of allowing the base station 108 the flexibility to determine when to schedule association sections 310. This is useful during periods of high transmission activity, when an association section 310 may be postponed to maximise data throughput in the network. An upper limit to the length of time that an association section 310 can be postponed may be specified for the system. The flexibility in scheduling association sections 310 is also useful during periods of lower activity, when more association sections 310 may be scheduled to enable wireless terminals 102 to associate with small time delays.

Figure 7:
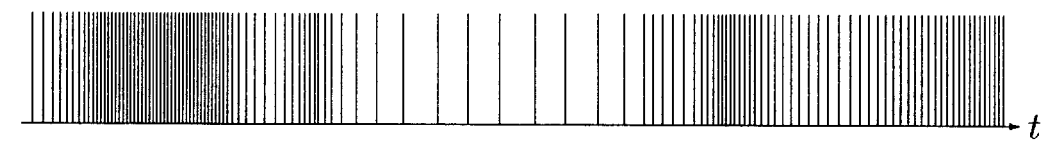
FIG. 7 in the lower half is a graph showing an example of the variation of network load with time (t) and in the upper half showing the corresponding scheduling of association sections.
Figure 7:
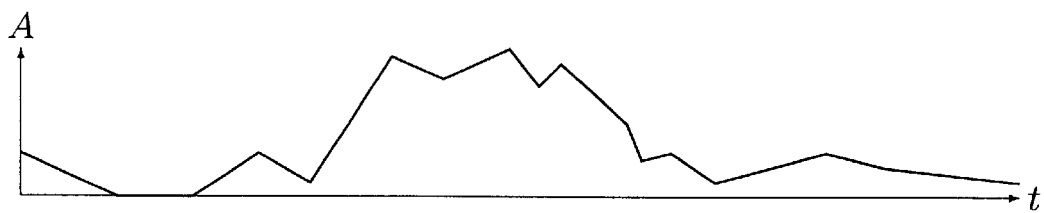

A possible scenario showing the scheduling of association sections with varying network load is shown in FIG. 7. The lower part of the figure is a plot of network activity A against time t, where A might be measured in transmitted bytes per second. The upper part of the figure shows the times at which association sections 310 are scheduled. In this example when the network load is high the frequency of association sections 310 is reduced, but the base station 108 also ensures that the time between association sections 310 never exceeds a maximum (for example at least one association section 310 every five seconds).

The approach described above is equally applicable to a peer to peer network using the transmission frame format shown in FIG. 4. The main difference is that the control function for the network is performed by a dynamically chosen enhanced wireless terminal 202.

From reading the present disclosure, other modifications will be apparent to persons skilled in the art. Such modifications may involve other features which are already known in the design, manufacture and use of wireless networks and component parts thereof which may be used instead of or in addition to features already described herein.

What is claimed is:

1. A method of operating a wireless network, wherein transmission of data takes place in transmission frames of variable length subdivided into a plurality of time slots, the wireless network comprising a controller and a variable number of wireless terminals, the method comprising the controller maintaining a list of wireless terminals currently registered with the network, determining the lengths of successive transmission frames, and allocating time slots within said frame for various purposes, wherein the controller scheduling a variable number n of association sections in each transmission frame, where n has a minimum value of zero, in response to the current operating characteristics of the network, by which association sections the wireless terminals can register with the controller.

2. A method as claimed in claim 1, characterised in that an operating characteristic of the network used to determine the number of association sections to schedule is the loading of the network.

3. A method as claimed in claim 1, characterised in that an operating characteristic of the network used to determine the number of association sections to schedule is the presence of a high security application utilising the network.

4. A method as claimed in claim 1, characterised in that the scheduling of association sections can be suspended when the network has allocated its entire capacity to tasks other than association.

5. A controller for a wireless network having a plurality of wireless terminals, the controller comprising means for maintaining a list of wireless terminals currently registered with the network, means for monitoring the operating characteristics of the network, means for determining the lengths of successive transmission frames and means for allocating time slots within each of said frames, means responsive to the current operating characteristics of the network for scheduling a variable number n of association sections in each transmission frame, where n has a minimum value of zero.

6. A base station comprising a controller for a wireless network having a plurality of wireless terminals, the controller comprising means for maintaining a list of wireless terminals currently registered with the network, means for monitoring the operating characteristics of the network, means for determining the lengths of successive transmission frames and means for allocating time slots within each of said frames, means responsive to the current operating characteristics of the network for scheduling a variable number n of association sections in each transmission frame, where n has a minimum value of zero.

7. A base station as claimed in claim 6, further comprising means for connecting to a fixed telecommunications network and means for exchanging data with said network.

8. A wireless terminal for use in a wireless network constituted by at least one wireless terminal and a controller, the wireless terminal comprising transceiver means for obtaining scheduling information relating to transmission frames in the network, means for determining whether an association section is available in a transmission frame and in that in response to said means the wireless terminal attempts association during the association section.

9. A wireless terminal as claimed in claim 8, characterised in that means are provided for turning off at least the transceiver means for the duration of a transmission frame if no association section-has been scheduled.

10. A wireless terminal for use in a wireless network constituted by at least one wireless terminal and a controller, the wireless terminal comprising transceiver means for obtaining scheduling information relating to transmission frames in the network, means for determining whether an association section is available in a transmission frame, said means enabling the wireless terminal to attempt association during the association section, and a controller comprising means for maintaining a list of wireless terminals currently registered with the network, means for monitoring the operating characteristics of the network, means for determining the lengths of successive transmission frames, means for allocating time slots within each of said frames and means responsive to the current operating characteristics of the network for scheduling a variable number n of association sections in each transmission frame, where n has a minimum value of zero, the controller enabling the wireless terminal to function as a base station in a peer to peer network.

* * * * *